United States Patent [19]
Johnston et al.

[11] Patent Number: 5,605,008
[45] Date of Patent: Feb. 25, 1997

[54] PLANT SHELTER

[75] Inventors: David B. Johnston, Fairport, N.Y.; Vincent P. Johnston; Marjorie R. Johnston, both of Sheridan, Wyo.

[73] Assignee: Northern Tier Gardens Corporation, Fairport, N.Y.

[21] Appl. No.: 565,850

[22] Filed: Dec. 1, 1995

[51] Int. Cl.⁶ .................................................. A01G 13/02
[52] U.S. Cl. .................................. 47/21; 47/28.1; 52/80.1
[58] Field of Search ................................. 52/80.1, 81.4; 47/21, 21 A, 30, 26 R, 28.1 C

[56] References Cited

U.S. PATENT DOCUMENTS

| 2,978,837 | 4/1961 | Daniels | 47/30 |
| 3,093,930 | 6/1963 | Witkowski | 47/69 |
| 3,226,881 | 1/1966 | Garrett | 47/30 |
| 3,552,549 | 1/1971 | Creese et al. | 47/69 |
| 4,186,670 | 2/1980 | Hagner | 47/69 |
| 4,655,013 | 4/1987 | Ritland | 52/81.4 |
| 5,016,388 | 5/1991 | Burress et al. | 47/21 |
| 5,222,325 | 6/1993 | Angus | 47/30 |

FOREIGN PATENT DOCUMENTS 083003278 9/1983 WIPO ....................................... 52/80.1

Primary Examiner—Terry Lee Melius
Assistant Examiner—Joanne C. Downs
Attorney, Agent, or Firm—Jaeckle Fleischmann & Mugel, LLP

[57] ABSTRACT

A shelter for protecting young plants comprising a shell made from a resilient resin material, formed of two substantially identical mating sections integrally formed with connecting snaps and selectively closable openings for providing air and irrigation to the plants.

12 Claims, 4 Drawing Sheets

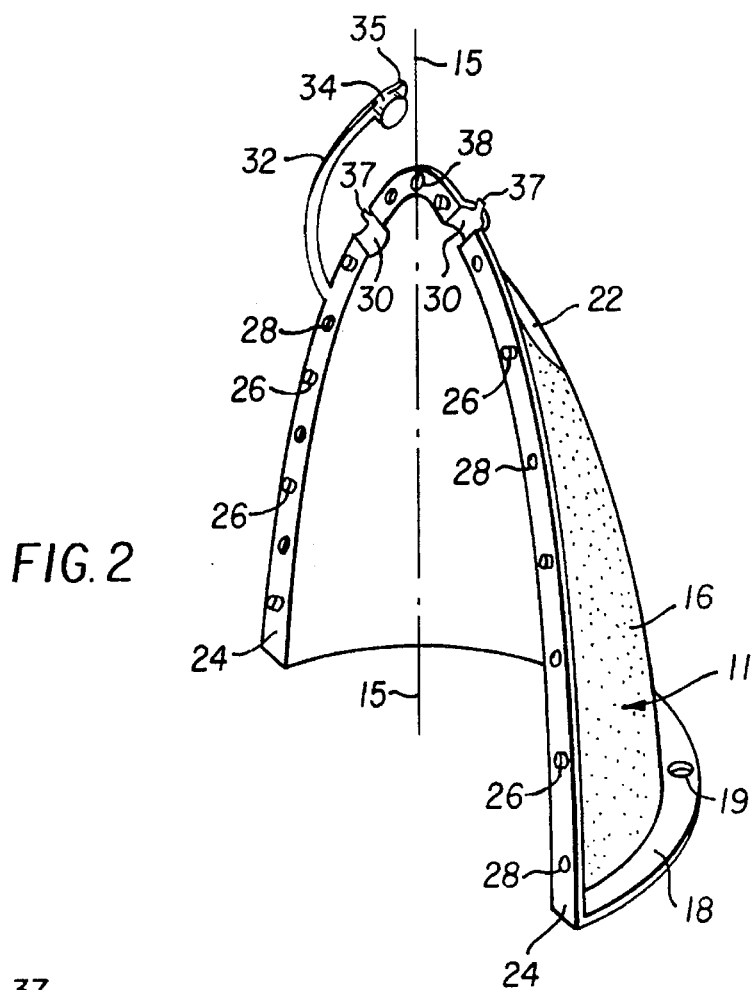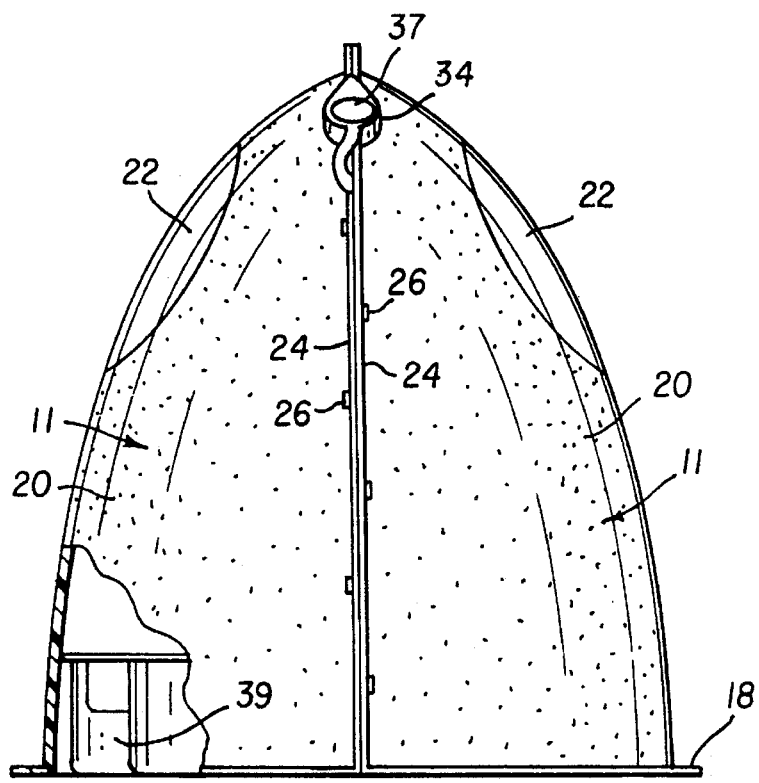

PLANT SHELTER

BACKGROUND

Plant shelters are used to protect young plants against early frost, damaging wind, unseasonably cool weather, heavy rain, hail, excessive sunlight, and insects and other pests. Heat and moisture are also conserved within the shelters to provide an environment that promotes seed germination and plant growth. Plant shelters thus allow for earlier plantings and can significantly extend growing seasons, especially in colder climates.

There are many designs of plant shelters described in the prior art. For example, Easterling U.S. Pat. No. 718,109, Scott U.S. Pat. No. 912,184, and Campbell U.S. Pat. No. 1,112,052 each describe a plant protective cover with a wire support frame and a canvas or cloth cover. Formed paper and thin plastic caps with and without fixed openings are other known designs. Other plant protectors are described in U.S. Pat. No. 3,812,616, which also includes a rigid frame and in this case a transparent, flexible plastic cover, and British Patent Specification No. 714,784, which describes a cover made of a semi-rigid polyvinyl with stiffening ribs.

The prior art further includes various means for controlling ventilation in plant shelters. U.S. Pat. No. 3,214,865 to Rosenvold et al, for example, discloses a plant shelter formed from a transparent or translucent plastic material that is perforated to form a series of knockout sections from which ventilation openings are formed. U.S. Pat. No. 1,814,339 to Sato discloses a glass plant shelter that controls admission of air with an adjustable cap covering an opening and in which light is controlled by a rotatable corrugated glass side intended to diffuse light and heat.

Our own prior invention of an improved plant shelter, as described in our U.S. Pat. No. 5,398,443, compromises a dome-shaped translucent body or shell molded from a resin material, having openings or windows formed in a peripheral wall of the shell, and a cover made of transparent flexible film. The cover alternately can overlay the windows to protect the interior from wind, or rolled up at its open end to expose some or all of the windowed areas to adjust the amount of air admitted through the windows.

SUMMARY OF THE INVENTION

Our invention as described in this application is to provide a simple and easily made shelter of two or more substantially identical sections that can provide the advantages of protection and growth control for young plantings, yet be easily assembled and disassembled, usable indefinitely for many seasons and easily and compactly transported to planting sites or stored between planting seasons.

DRAWINGS

Our invention can be more readily understood by reference to the following detailed description of a preferred embodiment and the accompanying drawings wherein:

FIG. 2 is a perspective view of one of the sections showing the section connecting means in more detail.

FIG. 4 is a side view of the plant shelter of FIG. 1. showing the sections as assembled.

DETAILED DESCRIPTION

Figure 1:
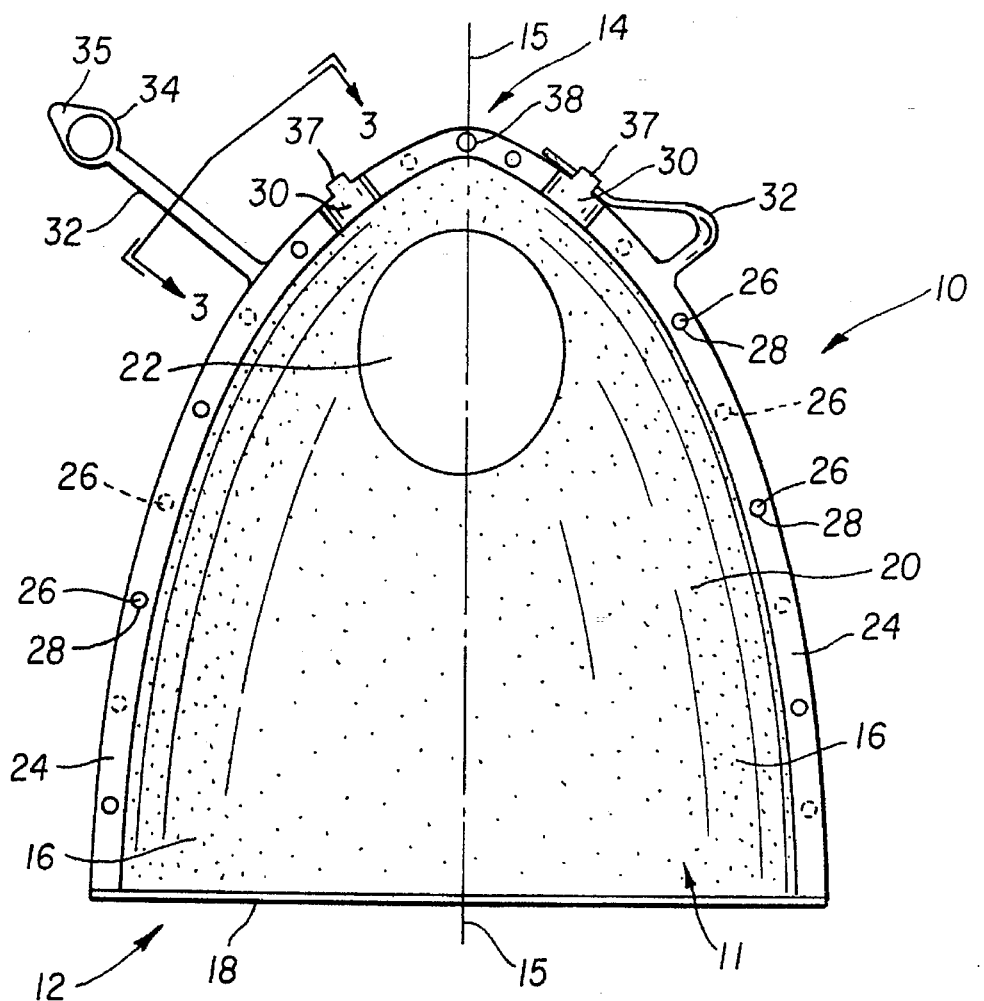
FIG. 1 is a front view of a plant shelter according to our invention and using two substantially identical sections.
Figure 3:
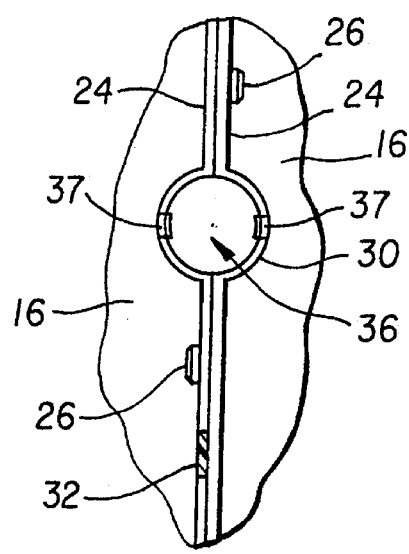
FIG. 3 is a partial top view taken on line 3—3 of FIG. 1 showing one of the controllable air and irrigation vent openings of the plant shelter.

The preferred embodiment of the plant protector or shelter according to our invention comprises a cover body or shell 10 preferably substantially parabolic in shape, which is made of two separable and substantially identical half sections 11 of a rigid but resilient molded preferably non-permeable clarified resin such as a clarified polypropylene (CPP) or other suitable resin including recycled resin. The needed properties of the resin to form the sections 11 can be readily determined by those skilled in the molding arts. When assembled the two sections 11 form an open end 12 at the bottom, a closed end 14 at the top, and a peripheral side wall 16 that surrounds an interior space to contain one or more seedlings or plants.

Molded into each section 11 at the open end 12 is an integral base flange 18, over which soil can be packed to hold the assembled shell 10 in place over the planting(s) to be protected. Holes 19 may also be included in order to use ground stakes. The closed end 14 together with the peripheral wall 16 of each section 11 preferably represents one half of a substantially parabolic surface centered about an axis 15, the shape of which is preferred for shedding water and proper light diffusion.

In molding each section 11, the side wall 16 is formed to include both a translucent surface area 20 and a transparent "window" area 22, the means for creating the translucent and transparent areas being well known in the resin molding art by appropriate treatment of the walls of the mold in which the sections 11 are formed. Each window area 22 provides a clear area with which to monitor plant development visually.

Each of the window areas 22 as shown is approximately circular in area although other two-dimensional shapes may be used to allow a controlled amount of direct undiffused sunlight to enter the shell without interruption throughout the day. However, by locating the windows 22 on the side walls 16 to face east and west, young plants can be protected from direct sunlight at midday, when the sun is highest in the sky.

Preferably virtually along the entire length of the peripheral edges of the side wall 16 of each of the sections 11 is a flat mating or face flange 24 which when the shelter 10 is assembled readily abuts against the corresponding opposite flange 24 of the other section 11. To detachably connect the sections 11 during use, each mating flange 24 includes alternating male snaps or studs 26 and female stud receiving holes 28 of slightly smaller cross section integrally molded into the mating flanges 24. As can be seen, each the studs 26 of one of sections 11 is positioned to mate with one of the holes 28 of the other, opposing section 11 when the two sections 11 are brought together by matching the opposing mating flanges 24. The studs 26 and holes 28 are dimensioned such that because of the resiliency of the resin, they are frictionally engaged to hold the sections 11 together but also permit easy separation simply by pulling the sections 11 apart at their open ends 12.

Also according to our invention, the mating flanges 24 of each of the sections 11 are formed as shown with preferably two semicylindrical "vent" holes 30 along the entire width of flanges 24 and the thickness of the side wall 16. Integrally molded with the mating flange 24 adjacent only one of the veto holes 30 is a short flexible strap 32 to the free end of which is integrally molded a cylindrical vent plug 34 and removal tab 35. As can be seen, when the two sections 11 are connected together, the holes 30 form two complete cylindrical ventilation and irrigation openings 36 to the interior of shelter 10 with the adjacent vent plugs 34 to selectively cover and uncover the vent openings 36. Also molded into each flange 24 is a detent 37 to releasably lock the plug 34 onto the corresponding opening 36. Either or both of the vent plugs 34 can be plugged into or removed from the vent openings 36 as desired to allow air to flow between the outside and inside of the plant shelter 10 and to provide an opening by which to irrigate the contained plant(s) as for example by a flexible water feeding tube (not shown).

As the walls 16 of the sections 11 are substantially parabolic in shape, it can be seen that the sections when not in use are easily stacked or nested together for relatively compact storage, and in fact, a substantial number of the sections 11 can be nested together for easy packing, shipment and storage. Because the sections 11 are identical, a large number of plant shelters 10 can be assembled with no worry toward finding the right mate. Also, we have provided a hole 38 at the closed end of each section 11 by which the sections 11 can be hung for ease of manufacture and storage.

In use, two sections 11 are connected together by light hand pressure against the opposing mating flanges 24 until the studs 26 snap into the opposing holes 28. The assembled plant shelter 10 then is placed over one or more young seedlings or seeded areas and the plugs 34 covering or uncovering the vent openings 36 as appropriate for the particular plantings. The shelter 10 traps heat and moisture within its inner space, providing a controlled environment for promoting early growth of young plants. Water and plant nutrients can be provided as needed through the vent holes 30. When a planting has matured sufficiently to withstand ambient temperatures and humidity, but is still somewhat sensitive to wind or direct sun, the downwind or shade side section 11 can be removed and the other section 11 left in place to protect the plant from wind. Section 11 is sufficiently stable to remain in place.

As shown in FIG. 1, the shelter 10 may also be used with a seed tray 39, in this case circular in shape with a number of seed wells into which seeds and plant growing material is placed. If used outdoors or in other environments in which wind or animals might tend to dislodge the shelter 10, dirt or other appropriate weighting matter can be applied over the base flanges 18, or plant stakes driven into the ground through optional holes 19 (see FIG. 2) in the base flange 18. During seed germination and early plant growth, the plugs 34 can alternately be removed from or inserted into openings 36 to enable air circulation and application of water and/or plant treating material through the openings 36 without disturbing the weighted shelter 10 or shocking the plants.

We have found that a very versatile shelter according to our invention and usable with a wide variety of garden plants preferably is one that has overall wall and flange thickness of about ⅛" and is dimensioned at about twelve inches in diameter at the open end 12 and about twelve inches high at the central axis. The clear windowed areas preferably are about five inches in diameter, the center of which is about five inches down from the closed end 14 as measured on the side wall 16. Each of flanges 18 and 24 preferably are approximately ½ inch wide, whereas openings 36 each usefully is about ¾ inch in diameter.

Figure 5:
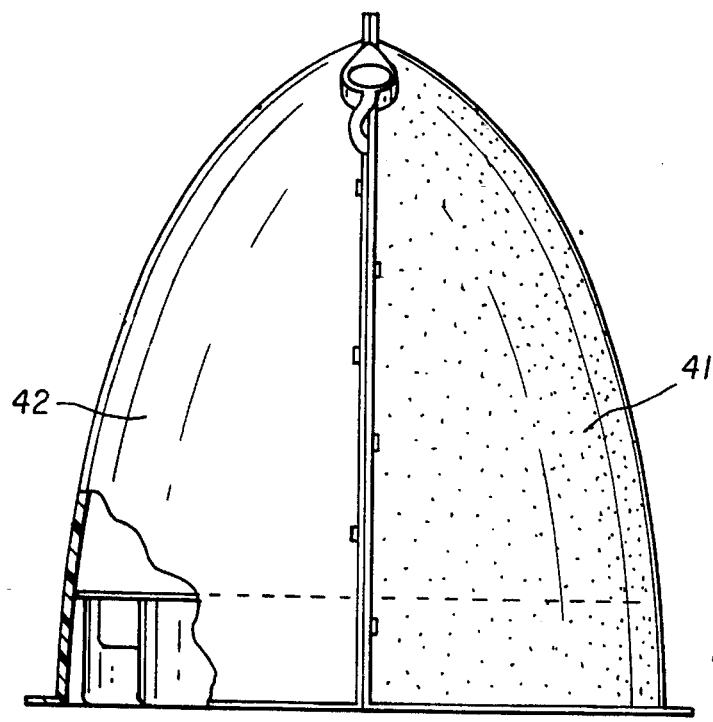
FIG. 5 is a side view of an alternative embodiment of our plant shelter.

Although our preferred embodiment provides for substantially identical sections 11, there may be applications in which an alternate embodiment of the plant shelter as shown in FIG. 5 is desired. In this case, one section 41 is substantially entirely translucent and the mating section 42 substantially entirely transparent. This embodiment may be more desirable where more light is required but direct, nondiffused sunlight on the plants is to be avoided. However, it can also be seen that sections 41 and 42 may be made in various combinations of translucent and transparent surface areas to tailor the plant protection for specific plants and/or growing areas.

Figure 6:
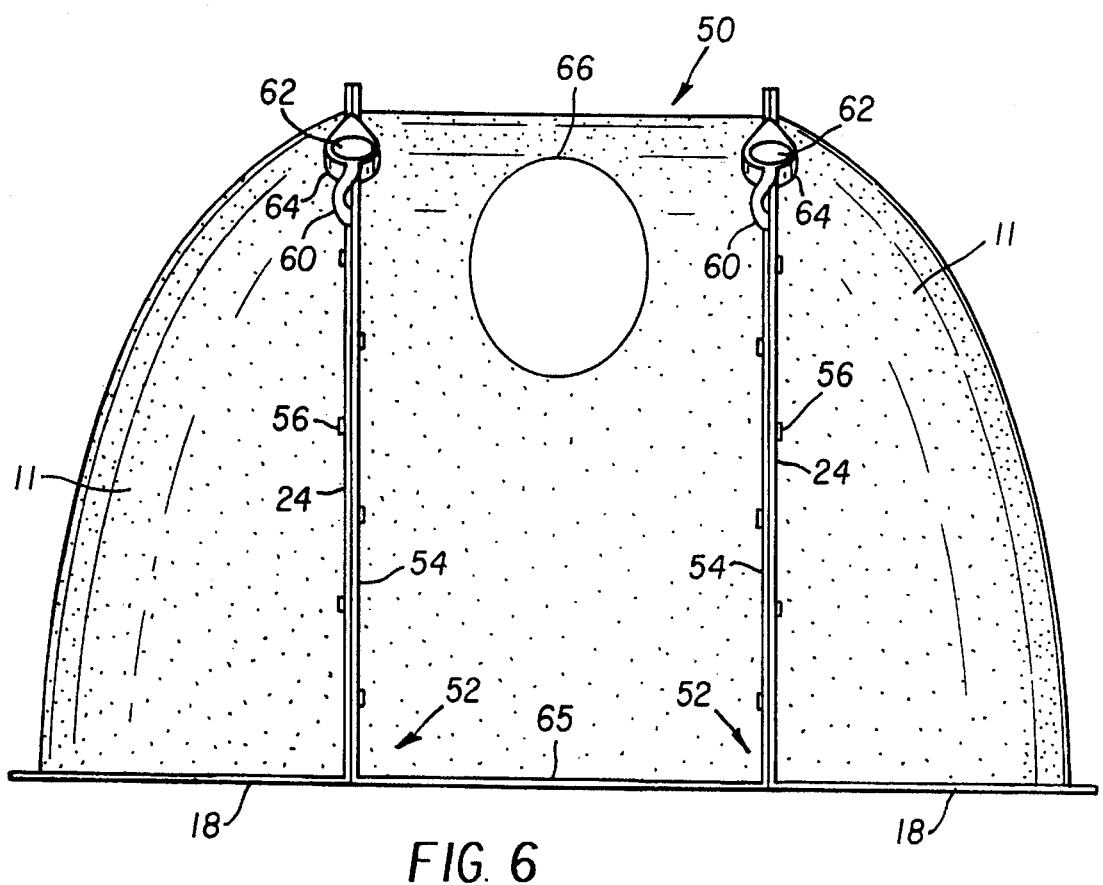
FIG. 6 is a side view of another embodiment of our invention and showing an extender section to enable variations in lengths of plantings to be protected.
Figure 7:
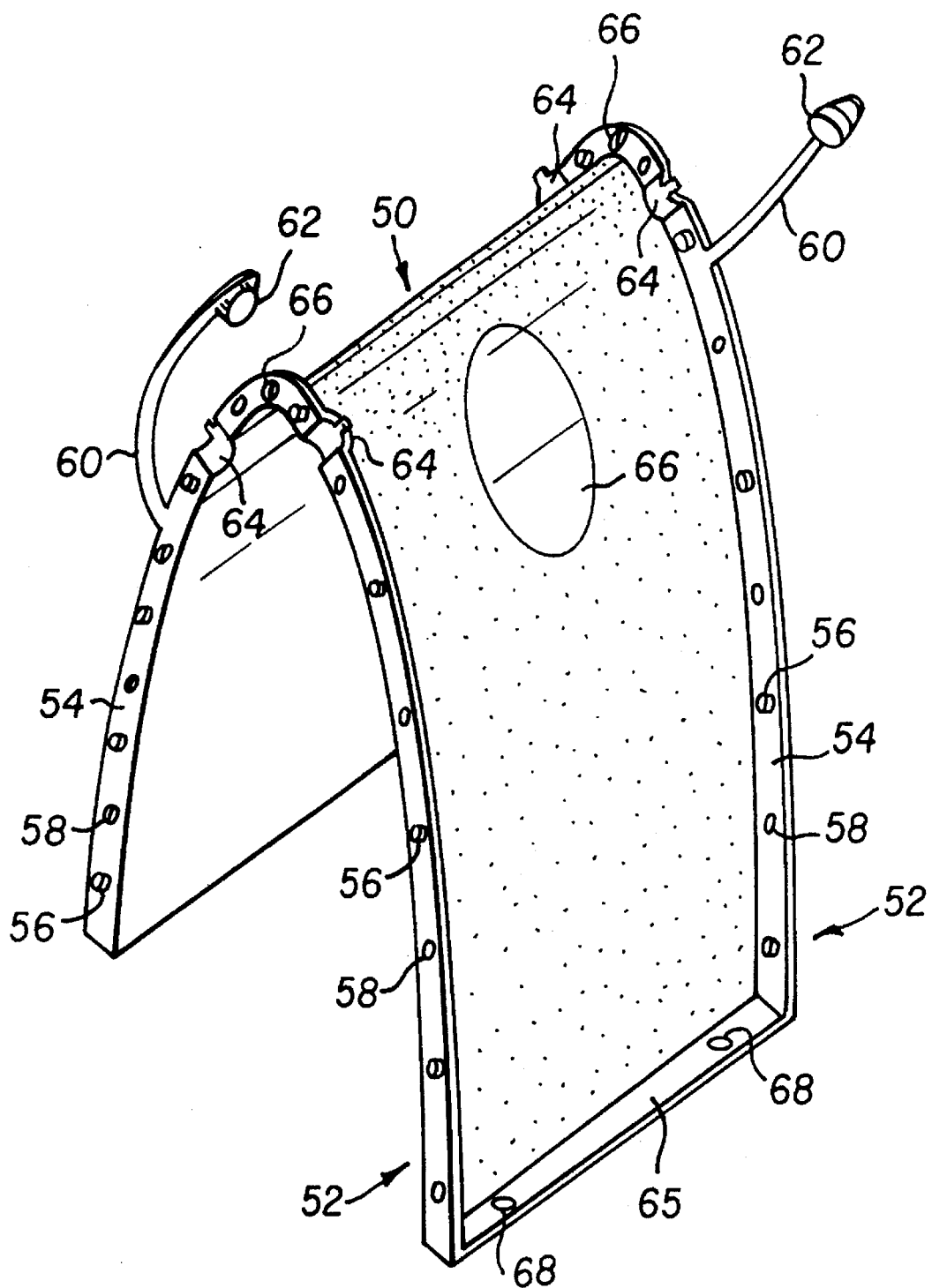
FIG. 7 is a perspective view of the extender section of FIG. 6.

A further feature and advantage of our invention is shown in FIGS. 6 and 7. In this instance, we have provided a shelter extender 50 of uniform width matching the width of each section 11 at the mating flanges 24. Both ends 52 of the extender 50 include corresponding mating flanges 54 identical to flanges 24 of sections 11, including the alternating matching studs 56 and stud holes 58, with a strap 60 and plug 62 adjacent to one of vent holes 64 at each end 52, as well as opposing base flanges 65, hangar holes 66 and staking holes 68. A suitably dimensioned transparent window area 66 preferably is also included in a substantially translucent surface. Thus, one or more extenders 50 can be added between the sections 11 to provide plant protectors of variable lengths to cover either rows of crops or to start vine plants and the like.

Although our invention is described by reference to specific preferred embodiments, it is clear that variations can be made or other material used without departing from the spirit of the invention as claimed. For example, it is possible to alter each section from a parabolic shape to another shape useful to specific plants such as a cylinder or cone, and to adapt the air/irrigation vent holes to frictionally retain a watering tube for unattended irrigation. Also, the number, size and location of vent plugs and vent holes can be varied. The vent plugs themselves may compromise a sliding or rotating cover as is used for example in disposable condiment dispensers t to permit incremental adjustments in the vent openings. It also is possible to form the sections in arcs shorter than 180 degrees, as for example three sections each of 120 degrees or four sections each of ninety degrees if a more compact storage is desired, or different exposed areas are appropriate for semistable emerging plants if any one of the sections is to be removed.

We claim:

1. A dome-shaped plant shelter for protecting seed germination and young plants in the ground compromising:

at least two substantially identical mating sections, each section having a curved peripheral side wall with an open side, a narrow closed top end, a wider bottom end, an axis about which the side wall is formed, and a substantially continuous edge at the open side of the peripheral side wall, the two sections forming an enclosed interior space between them when the substantially continuous edges of the sections are placed against each other and the bottom ends of the sections placed on the ground;

connecting means formed on the substantially continuous edges of both sections for readily and detachably connecting the sections to each other, the connecting means comprising a substantially continuous mating flange on each of the sections and integral with the substantially continuous edge of the section, each flange having a face extending substantially laterally away from the axis of the section for mating with the face of the flange of the other section, and male and female resilient snap connectors integrally formed on each flange face and positioned such that the male snap connectors of each one of the sections detachably engages the female snap connectors of the other of the sections when the mating flange faces of the sections are hand pressed against each other:

means formed by the mating flanges for defining an access opening to the interior space; and closure means formed on the connecting means for selectively opening and closing the access opening to the interior space for selectively admitting ambient air and plant irrigation.

2. The shelter of claim 1 in which the closure means comprises plug means integrally formed with the connecting means for selectively closing the opening.

3. The shelter of claim 1 in which the side wall of each section further comprises a predominantly translucent surface area to diffuse light admitted to the interior space and a transparent window area for visual access to the interior space.

4. The shelter of claim 1 in which the two sections comprise end sections, and further comprising at least one elongated extender section having two opposing open ends with mating flanges that are substantially equal in dimension and shape to the mating flanges of the two end sections, and opposing side walls between the open ends, the extender section further comprising second connecting means substantially identical to the end section connecting means for detachably engaging the connecting means of the end sections when positioned between the end sections.

5. The shelter of claim 4 in which the mating flanges of the extender section and the mating flanges of the end sections are substantially parabolic in shape and the extender section further comprises closure means mating with the closure means of the end sections.

6. The shelter of claim 1 in which the closure means comprises a vent plug formed integrally with the connecting means.

7. A dome-shaped plant shelter for protecting plants compromising:

at least two substantially identical mating sections, each section having a curved peripheral side wall with an open side, a narrow closed top end, a wider bottom end, an axis about which the peripheral side wall is formed, and a mating edge at the open side of the peripheral side wall, the two sections forming an enclosed interior space between them when the mating edges of the sections are placed against each other and the bottom ends placed on the ground;

connecting means formed on the mating edges of both sections for detachably connecting the sections to each other, the connecting means comprising mating flanges formed integrally with the mating edges, and alternating male and female resilient snap connectors integrally formed on the flanges and positioned such that the male snap connectors of each one of the sections detachably engages the female snap connectors of the other of the sections when the mating flanges of the sections are connected to each other; and closure means for selectively opening and closing access to the interior space for selectively admitting ambient air and plant irrigation, the closure means comprising at least two substantially semi-cylindrical surfaces formed by the mating flange of each section, by which the surfaces form two substantially circular openings to the interior space when the sections are connected, and plug means comprising a flexible strap joined at one end to the mating flange of each one of the sections and a resilient plug joined at the other end of the strap, the plug of each section being positioned to removably cover one of the two openings formed by the surfaces.

8. A shelter for protecting seed germination and young plants having an open bottom end, a closed top end and a substantially continuous side wall between the bottom and top ends to define an interior space, the shelter comprising:

at least two substantially identical shell-shaped sections made from a resilient, rigid resin material, each section forming a substantial portion of the side wall and having a substantially continuous mating edge which when joined to the mating edge of the other section forms the continuous side wall;

a mating flange formed on the mating edge of each section and extending radially away from the side wall, the mating flange defining a mating surface to abut the corresponding mating surface of the mating flange of the other section;

means formed in the mating flanges of both sections for detachably connecting the sections when the flanges are hand pressed together;

means formed by the mating flanges for defining at least one opening to the interior space; and removable plug means formed on the flange of at least one of the sections for selectively admitting plant treating material and air into said interior space through said at least one opening when the sections are connected.

9. The shelter of claim 8 in which the connecting means comprises alternating male and female resilient snap connectors integral with the mating flanges of both sections and positioned such that the male snap connectors of each one of the sections detachably engages the female snap connectors of the other of the sections when the mating flanges are hand pressed together.

10. The shelter of claim 8 in which the portion of the continuous side wall of each section further comprises a predominantly translucent surface area to diffuse light admitted to the interior space and a transparent window area for visual access to the interior space.

11. The shelter of claim 8 in which the mating flanges are substantially parabolic in shape, and further comprising at least one extender section with opposing mating flanges and detachable connecting means, with both the opposing mating flanges and the detachable connecting means of the extender section substantially dimensionally identical to the mating flanges and detachable connecting means of the first two sections, to enable the extender section to be removably attached by hand pressing the mating flanges of the extender section to the mating flanges of the first two sections to form a shelter of greater length.

12. A shelter for protecting plants having an open bottom end, a closed top end and a substantially continuous side wall between the bottom and top ends to define an interior space, the shelter compromising:

at least two substantially identical shell-shaped sections, each section forming a substantial portion of the side wall and having a substantially continuous mating edge which when joined to the mating edge of the other section forms the continuous side wall;

a mating flange formed on the mating edge of each section and comprising a mating surface to abut the corresponding mating surface of the mating flange of the other section;

means formed in the mating flanges of both sections to detachably connect the sections; and removable plug means to selectively admit plant treating material and air into said interior space when the sections are connected, the plug means comprising (a) at least two substantially semi-cylindrical surfaces formed by the mating flange of each section, by which the semi-cylindrical surfaces form two openings to the interior space when the sections are connected, and (b) a resilient plug joined to the mating flange of each one of the sections adjacent to one of the openings, the resilient plug of each section being positioned to removeably fit into one of the two openings formed by the semi-cylindrical surfaces.

* * * * *